United States Patent
Thompson

(10) Patent No.: US 10,080,032 B2
(45) Date of Patent: Sep. 18, 2018

(54) LOSSY CHANNEL VIDEO BLUR AVOIDANCE

(71) Applicant: Polycom, Inc., San Jose, CA (US)

(72) Inventor: Edmund Thompson, Burlington, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/601,947

(22) Filed: May 22, 2017

(65) Prior Publication Data

US 2017/0374381 A1 Dec. 28, 2017

Related U.S. Application Data

(63) Continuation of application No. 13/770,178, filed on Feb. 19, 2013, now Pat. No. 9,661,325.

(60) Provisional application No. 61/600,084, filed on Feb. 17, 2012.

(51) Int. Cl.
   *H04N 7/12* (2006.01)
   *G06K 9/36* (2006.01)
   *H04N 19/53* (2014.01)
   *H04N 19/86* (2014.01)

(52) U.S. Cl.
   CPC ............ *H04N 19/53* (2014.11); *H04N 19/86* (2014.11)

(58) Field of Classification Search
   CPC ............ H04N 7/18; H04N 7/20; H04N 19/61
   See application file for complete search history.

(56) References Cited

U.S. PATENT DOCUMENTS

| | | | | |
|---|---|---|---|---|
| 7,646,817 B2* | 1/2010 | Shen | ............... | H04N 19/159 375/240.25 |
| 2003/0123537 A1* | 7/2003 | Yona | ............... | H04N 7/152 375/240.01 |
| 2003/0128968 A1* | 7/2003 | Lin | ............... | H04N 9/8042 386/230 |
| 2005/0015259 A1 | 1/2005 | Thumpudi | | |
| 2006/0104349 A1* | 5/2006 | Joch | ............... | H04N 19/159 375/240.03 |
| 2008/0037888 A1* | 2/2008 | Lee | ............... | H04N 19/176 382/251 |
| 2009/0080517 A1* | 3/2009 | Ko | ............... | H04N 19/176 375/240.03 |
| 2009/0252227 A1* | 10/2009 | NepomucenoLeung | ............... | H04N 19/107 375/240.13 |
| 2011/0075037 A1* | 3/2011 | Jalil | ............... | H04N 19/176 348/607 |

* cited by examiner

*Primary Examiner* — Tsion B Owens
(74) *Attorney, Agent, or Firm* — Blank Rome, LLP

(57) ABSTRACT

Blurriness in a video image transmitted over a lossy network can be reduced by filtering the decoder output to determine whether updating of the reference frame based on the current video data is indicated. An update may be appropriate if the decoder output is sharper than the contents of the display buffer after the last update. Additionally, an update may be appropriate if there was a significant change to the underlying image, and thus to the encoder's input. Whether such a change has occurred can be determined by analyzing the prediction mode, motion vectors, and pixel data of the output image.

20 Claims, 2 Drawing Sheets

LOSSY CHANNEL VIDEO BLUR AVOIDANCE

CROSS-REFERENCE TO RELATED APPLICATIONS

This application is a continuation of U.S. application Ser. No. 13/770,178, filed Feb. 19, 2013, which is a non-provisional of U.S. application Ser. No. 61/600,084, filed Feb. 17, 2012 both of which are incorporated herein by reference and to which priority is claimed.

FIELD OF THE DISCLOSURE

The subject matter of the present disclosure generally relates to video image processing. More specifically, the present disclosure relates to techniques for reducing blurriness in video that is caused by reduced quality Intra-coded frames sent in response to packet loss occurring on lossy networks.

BACKGROUND

Most digital video transmission bases new pictures on one or more previously transmitted pictures, known as "reference pictures." If a transmission error causes a flaw in a picture, continued use of that picture as a reference will tend to result in flawed pictures. Thus, flaws could exist indefinitely. In other words, errors propagate through time.

Typically, the decoder will know when an error has occurred and can send a message to the encoder informing it of the transmission error. The encoder responds by sending a picture that does not depend on any other picture, often called a "key" picture or "Intra" picture. An Intra picture will generally need many more bits than the normal ("Inter") pictures for equivalent quality. To avoid a long delay before the Intra picture is displayed, it often is sent at a lower quality. This results in a blurrier picture. Subsequent Inter pictures based on this Intra picture will typically become progressively sharper, unless there is a lot of motion or another transmission error occurs.

On lossy networks, such as the Internet, it is common for a transmission error to occur every few seconds. Using the typical procedures implemented by most encoder/decoder systems, this means that the picture gets blurry every few seconds as a new Intra picture is transmitted. Thus, it would be desirable to provide a mechanism by which this intermittent blurriness can be avoided.

BRIEF DESCRIPTION OF THE DRAWINGS

Preferred embodiments and other aspects of subject matter of the present disclosure will be best understood with reference to a detailed description, which follows, when read in conjunction with the accompanying drawings, in which.

Figure 1:
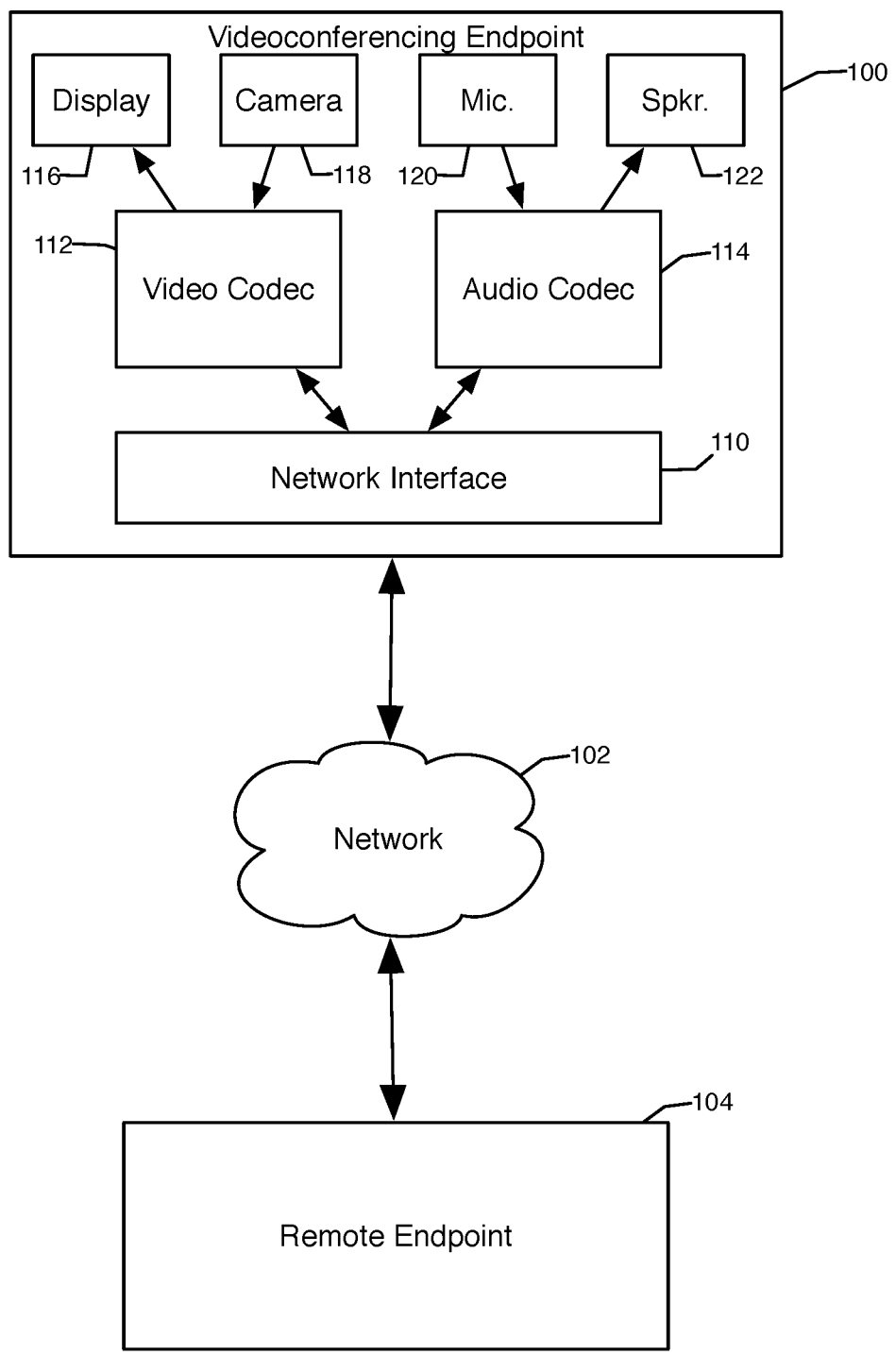
FIG. 1 illustrates one example of a videoconferencing arrangement.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

An exemplary videoconferencing arrangement is illustrated in FIG. 1. Videoconferencing endpoint 100 is coupled via network 102 to a remote endpoint 104. Each endpoint may take a variety of forms. A typical endpoint 100 may include a network interface 110, a video codec 112, and an audio codec 114. The video codec 112 can receive images from camera 118, encode them, and pass the encoded images to network interface 110 for transmission to the remote endpoint. Similarly, the video codec can receive encoded images from the remote endpoint 104, decode them, and pass them to display 116, where they can be perceived by a user. Additionally, the audio codec 114 can receive audio signals from microphone 120, encode them, and pass the encoded signals to network interface 110 for transmission to the remote endpoint. Finally, audio codec can receive encoded audio signals from the remote endpoint, decode them, and pass them to speaker 122 so they can be heard by a user of the videoconferencing endpoint 100.

Each of the components described above may take a variety of forms. For example, the videoconferencing endpoint may be an integrated unit, or the display, camera, microphones, and/or speakers may be separate from the unit. Additionally, there may be one or more displays, cameras, microphones, speakers, etc. The videoconferencing endpoint 100 can be a dedicated appliance, or can be a suitably programmed general purpose computer, or can be another device, such as a mobile phone, personal digital assistant, tablet computer, etc. The audio and video codecs may implement one or more of a variety of standards-based encoding schemes, such as G.721, G.729, etc. for audio coding or H.261, H.263, H.264, etc. for video coding. Additionally, these codecs can be hardware-based, software-based, or some combination of the two. The remote endpoint 103 can be a device that is substantially similar to endpoint 100, or can be a multipoint control unit (MCU), which facilitates multi-party conferencing. The blurriness reduction techniques described herein may be used in conjunction with any of these and other variations of the basic videoconferencing arrangement described above. Additionally, they may find applicability in other non-conferencing applications where video is sent over a lossy channel. However, for the sake of concreteness, they will be described with respect to an H.264 decoder. Additionally, the processing will be described as taking place on a macroblock-by-macroblock basis, although other picture units could also be used.

Figure 2:
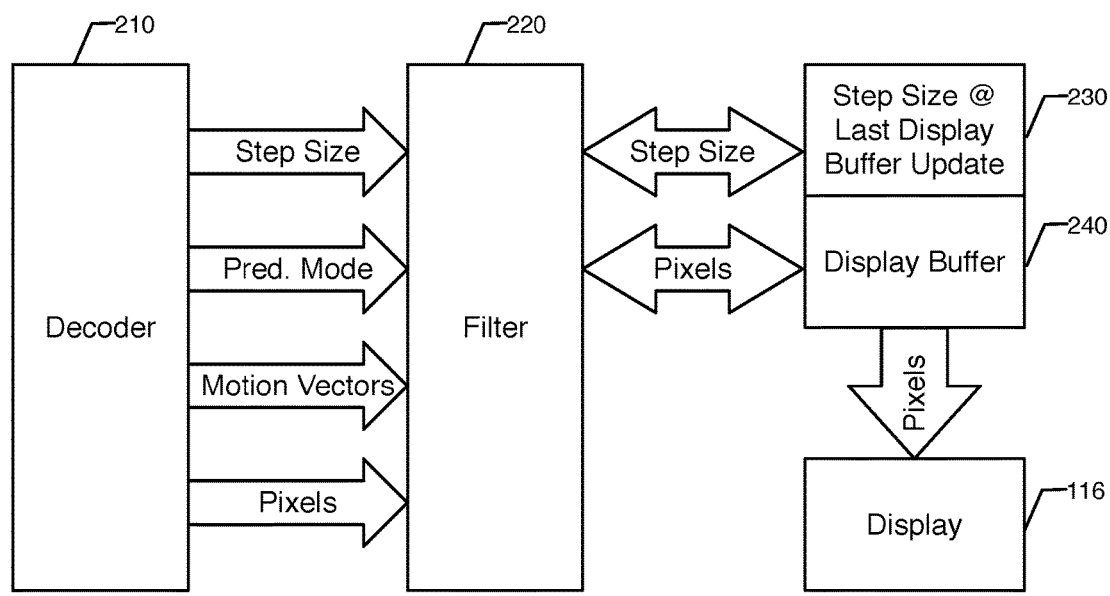
FIG. 2 illustrates a schematic showing the relationship of a video coder, filter, and display, along with associated memories and data exchanges, to implement the blurriness reduction techniques described herein.

FIG. 2 schematically depicts an arrangement for reducing the blurriness of video due to Intra frame updates as described above. Decoder 210 receives video data from the remote endpoint. For each macroblock of the decoded frame, the decoder, in conjunction with filter 220, decides whether to update the corresponding macroblock of the display buffer 240. Display buffer 240 is typically implemented as some form of random access memory (RAM). Filter 220, like the decoder, can be implemented in hardware or as a hardware/software combination, such as a programmed general purpose processor (CPU), graphics processing unit (GPU), digital signal processor (DSP), etc.). Additionally, filter 220 could be integrated with decoder 210 or with another component of the videoconferencing system;

however, for purposes of the following discussion, filter 220 will be discussed as being separate from decoder 210. Filter 220 can make the determination whether to update the display buffer, thereby mitigating the blurriness associated with an Intra update in at least some cases. If the corresponding macroblock in the reference frame has not changed, there is no reason to update the macroblock. On the other hand, the display buffer macroblock should be updated if either: (1) There was a significant change in the encoder's input; or (2) The decoded macroblock is at least as sharp as the display buffer macroblock. Because this second criterion is easier to determine, it may desirably be performed first in many embodiments.

The quantization step size (QP) is a simple quality measure that can be used to quantify the degree of sharpness in an image. Generally, the smaller the step size, the sharper the image. To decide whether the current version of a macroblock is better than what is presently stored in the display buffer, filter 220 can compare the step size of a decoded macroblock (received from decoder 210) with the step size used when the display buffer 240 was last updated (which can be retrieved from a memory 230). If the new step size is smaller, it can be expected that the new macroblock is sharper. Thus it would be desirable to update the display buffer 240. Alternatively, if the step size of the currently decoded macroblock is larger than when the corresponding macroblock of the reference frame was updated, the new macroblock is less sharp than what is presently stored, and it may not be desirable to update the buffer unless an update is required for some other reason (e.g., because the encoder's input has changed significantly). If the step sizes are the same, it is less clear what should be done to preserve the image quality of the picture stored in the display buffer. In general, it is probably safer to update the buffer, although either choice may be appropriate depending on other considerations.

Deciding whether there was a significant change in the encoder's input can involve several steps, and thus may be performed after the quantization step size comparison described above. Modern video codecs employ various forms of motion compensation. Motion compensated macroblocks imply that the object in front of the camera has moved. This motion is a strong indication that the encoder's input has changed, so in general one would expect to update the display buffer in such a case. Thus, if filter 220 receives the prediction mode (e.g., Intra vs. Inter) from the decoder, that information can be used to inform the process of deciding whether to update the display buffer.

However, sometimes a little bit of motion compensation may be an image processing artifact, such as may be applied to smooth out the block boundaries. Thus, it may be desirable for filter 220, which receives motion vector data from decoder 210 to apply some sort of threshold to the motion vectors associated with an inter coded block to determine whether the buffer 240 should be updated. Larger vectors would be taken as a sign that an update was appropriate, whereas smaller motion vectors would suggest that an update may not be required. Also, if more than one motion vector is used for a macroblock, it could be assumed that there really was motion, as opposed to some sort of smoothing artifact. This would indicate that a reference picture update would be in order.

Alternatively, the prediction mode information supplied by decoder 210 to filter 220 could indicate that a given block was intra coded in an inter frame. There are two main reasons why Intra coding may be used in Inter (P) frames. First, a background object could be uncovered by motion of a foreground object. Because this background object was not visible previously, inter-frame prediction cannot be used, and an intra frame is required. A second reason for using Intra coding could be that the distance travelled by a moving object is more than the motion estimator can handle. In other words, the motion is greater than the largest available value of a motion vector. In this case the encoder does not use motion compensation. Either of these reasons relate to a significant change in the encoder's input, and are thus indicative of a need to update the display buffer 240, even if the image is not necessarily sharper. Thus, the use of Intra coding in an Inter frame (i.e., prediction mode data) can be taken as a sign that the display buffer should be updated. Conversely, in Intra frames, all macroblocks use Intra coding. Thus, the use of Intra coding in such frames should not be taken as a sign of a need to update the reference frame.

A final step in deciding whether the encoder's input changed can involve direct comparison of the two macroblocks, i.e., a comparison of the pixel data or some information derived from the pixel data. If the macroblocks are very different, it is likely that the encoder's input changed. Conversely, small differences might be due to quantization error. One way to evaluate this possibility is as follows. First, via a 4×4 DCT block transform, filter 220 can transform the difference as an encoder would. Next, filter 220 can compare the resulting coefficients to a predetermined threshold. This threshold may be derived by multiplying the quantization step size of the decoded macroblock by a scale factor. Alternatively, one could use the sum of the step sizes rather than just the latest step size. This scale factor can be adjusted empirically until satisfactory results are obtained. In any case, differences that do not exceed the threshold may be indicative of macroblocks that are little changed, indicating that no update of the display buffer 240 is indicated. Differences that do exceed the threshold may be indicative of macroblocks that have changed substantially, indicating that an update of the display buffer 240 is warranted.

As a less computationally intensive alternative, the pixel data may be compared by taking a sum of absolute differences for each block. In such a system, each pixel of the new block is subtracted from the corresponding pixel of the reference frame. The absolute value of these differences are then summed across the block (or other processing unit). This sum can then be compared to a predetermined threshold, such as that described above, and the block stored in the display buffer updated or not depending on the result of said comparison.

The techniques described above may be applied to any of a variety of video decoders. In general, it would be preferable for filter 220 to use the same block size as the decoder. For example, H.263 uses 8×8 block transforms. Thus, a filter for use with H.263 would preferably use the same 8×8 transform. Conversely, a filter adapted for use with H.264 would use a 4×4 transform. It may also be desirable to use the same transform as the encoder. Additionally, although the foregoing description refers to discrete cosine transforms, other transforms may be used. This can include, for example the transform used in the H.264 codec, which is an integer based scaled approximation of a discrete cosine transform. As used herein, the terminology discrete cosine transform or DCT should be interpreted as encompassing these and other such transforms.

As noted previously, a processing device (e.g., computer, imaging device, camera, etc.) having an operating system can perform the video image processing methods, services, and techniques disclosed herein. In addition, a program storage device, readable by a programmable processing device, can have instructions stored on the program storage device for causing the programmable processing device to perform the processing methods and techniques disclosed herein.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method for reducing blurriness of video data, the method comprising:
    receiving video data at a decoder;
    decoding a picture unit derived from the video data, the decoded picture unit corresponding to a picture unit stored in a display buffer;
    determining, at a filter operatively coupled to the decoder, whether to update a display buffer operatively coupled to the decoder and a display device, based, at least in part, on a comparison of a quantization step size of the decoded picture unit with a quantization step size of its corresponding picture unit; and
    updating, by the filter, the display buffer with the decoded picture unit when the size of the quantization step of the decoded picture unit is smaller than or equal to the size of the quantization step of the corresponding picture unit stored in the display buffer.

2. The method of claim 1, wherein the picture unit is a macroblock.

3. The method of claim 1, wherein the filter is integrated with the decoder.

4. The method of claim 1, further comprising:
    determining, at the filter operatively coupled to the decoder, whether there is more than one motion vector associated with the decoded picture unit; and
    updating the display buffer with the decoded picture unit upon such determination.

5. The method of claim 4, wherein comparing a quantization step size of the decoded picture unit with a quantization step size of the corresponding picture unit occurs before determining whether there is more than one motion vector associated with the decoded picture unit.

6. The method of claim 5, wherein determining whether to update the display buffer is further based on whether a prediction mode associated with the decoded picture unit has been received from the decoder.

7. The method of claim 6, wherein determining whether to update the display buffer is further based on whether prediction mode information supplied by the decoder indicates that the decoded picture unit was intra coded in an inter frame.

8. The method of claim 5, further comprising:
    receiving motion vector data associated with the decoded picture unit from the decoder;
    comparing the motion vector data to a threshold; and
    updating the display buffer if the motion vector data exceeds the threshold.

9. The method of claim 5, wherein determining whether to update the display buffer is further based on comparing pixel data of the two picture units or on comparing information derived from the pixel data of the two picture units.

10. The method of claim 9, wherein comparing pixel data or information derived from the pixel data of the two picture units comprises:
    computing a difference between the two picture units;
    performing a discrete cosine transform on the computed difference, thereby generating a plurality of coefficients;
    comparing the plurality of coefficients to a threshold; and
    determining that the coefficients exceed the threshold.

11. The method of claim 10, wherein the threshold is determined based on the quantization step size of the decoded picture unit.

12. The method of claim 10, wherein the discrete cosine transform uses the same picture unit size as is used by the decoder.

13. The method of claim 9, wherein comparing pixel data or information derived from the pixel data of the two picture units comprises:
    computing a sum of absolute differences for each picture unit; and
    determining if the sum of absolute differences exceeds a threshold.

14. The method of claim 13, wherein the threshold is determined based on the quantization step size of the decoded picture unit.

15. A video system configured to reduce blurriness of video data, the video system comprising:
    a decoder configured to receive video data; and
    a filter operatively coupled to the decoder and configured to:
        determine whether to update a display buffer of the video system with a decoded picture unit derived from the video data by, at least, comparing a quantization step size of the decoded picture unit with a quantization step size of its corresponding picture unit; and
        update the display buffer with the decoded picture unit when the quantization step of the picture unit stored in the display buffer is larger than quantization step of the decoded picture unit.

16. The video system of claim 15, wherein the picture unit is a macroblock.

17. The video system of claim 15, wherein the filter is integrated with the decoder.

18. The video system of claim 15, wherein determining whether to update the display buffer further comprises determining whether the decoded picture unit has been motion compensated.

19. The video system of claim 15, wherein determining, by the filter, whether to update a display buffer of the video system with a decoded picture unit derived from the video data by the decoder is further based on at least one of:
    receiving a prediction mode associated with the decoded picture unit from the decoder;
    receiving motion vector data associated with the decoded picture unit from the decoder, comparing the motion vector data to a threshold, and determining that the motion vector data exceeds the threshold; and
    comparing pixel data of the two picture units or comparing information derived from the pixel data.

20. The video system of claim 15, wherein the video system is a multipoint control unit.

* * * * *